Oct. 14, 1941.                J. HAMILL                    2,258,704
                              VACUUM PAN
                   Filed May 17, 1939         3 Sheets-Sheet 1

Inventor
James Hamill
By Ritter, Mechlin & Muir
his Attorneys

Oct. 14, 1941.　　　J. HAMILL　　　2,258,704
VACUUM PAN
Filed May 17, 1939　　　3 Sheets-Sheet 2

Inventor
James Hamill
By Ritter, Mechlin & Muir
his Attorneys

Oct. 14, 1941.　　　J. HAMILL　　　2,258,704
VACUUM PAN
Filed May 17, 1939　　　3 Sheets-Sheet 3
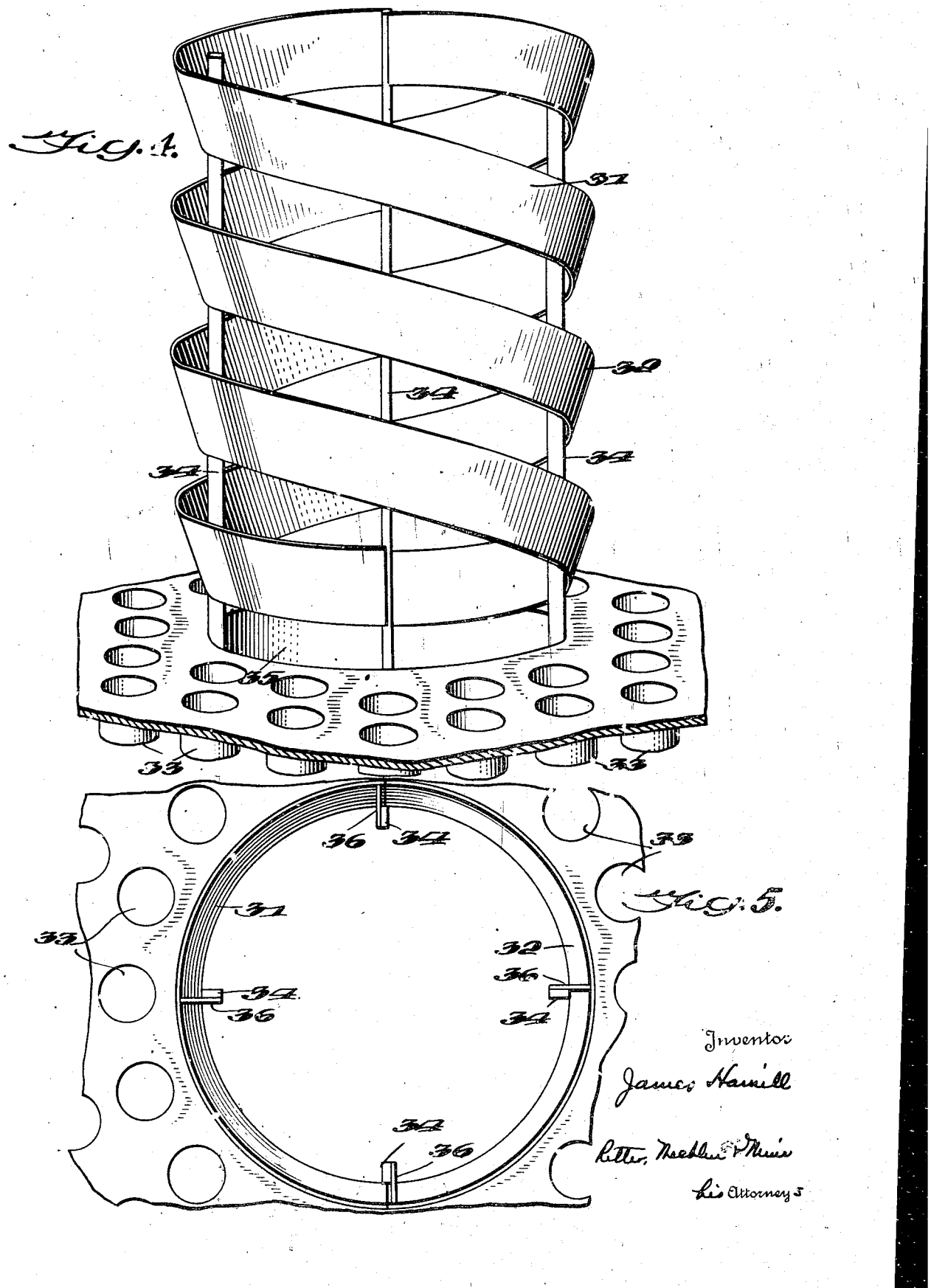

Patented Oct. 14, 1941

2,258,704

UNITED STATES PATENT OFFICE 2,258,704

VACUUM PAN

James Hamill, West Orange, N. J.

Application May 17, 1939, Serial No. 274,253

2 Claims. (Cl. 159—27)

My invention relates to vacuum pans and particularly to that type of pan which is customarily used in the concentration of sugar syrups and is commonly known in the art as the vertical tube type, that is, the type having a calandria provided with a downtake through which the circulating mass being concentrated descends to the space below the calandria and with a plurality of vertical tubes through which the circulating mass ascends to the space above the calandria.

The principal object of the invention is to provide improved means for promoting the separation of the ascending and descending currents in the circulating mass above the calandria by inducing the ascending stream containing the vapors to rise to the surface of the mass in the pan without interfering with the descending stream which has been freed of its steam so that a greater temperature differential will exist between the ascending and descending streams and the descent of the latter will be thereby accelerated.

A primary feature of the invention consists in providing a vacuum pan having a calandria with a tubular device positioned above the downtake of the calandria which forms a passageway for the circulating mass in the pan descending toward the downtake and which is provided with vertically spaced peripheral portions respectively having upwardly flaring outer surfaces for deflecting the circulating mass ascending adjacent the tubular device away from the circulating mass descending in the passageway.

Another feature of the invention consists in providing the pan with an enlarged circulating area above the calandria and with a tubular device positioned above the downtake of the calandria having vertically spaced peripheral portions provided with upwardly flaring outer surfaces for deflecting the circulating mass ascending adjacent the device outwardly toward said enlarged area.

Other and more specific features of the invention residing in advantageous forms, combinations and relations of parts will hereinafter appear and be pointed out in the claims.

In the drawings,

Figure 4 is a view similar to Figure 2 illustrating still another form of tubular device.

Figure 5 is a plan view of the structure illustrated in Figure 4.

Figure 1:
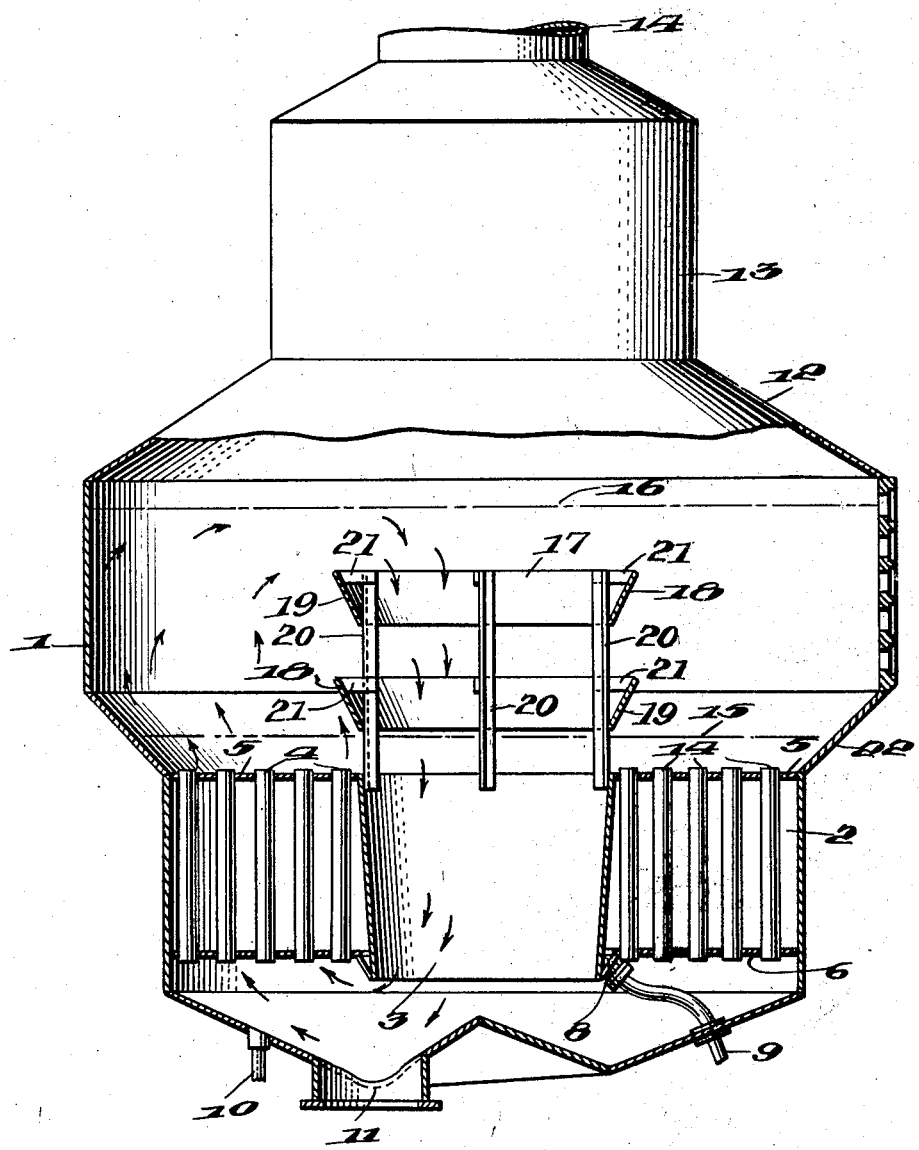
Figure 1 is a view partly in section and partly in elevation of a vacuum pan embodying my invention.

Referring more particularly to the drawings, 1 indicates the body of a vacuum pan and 2 a calandria having a central downtake 3 surrounded by a plurality of vertical tubes 4 which are supported in upper and lower tube sheets 5 and 6 respectively. Steam is admitted to the calandria through a suitable inlet (not shown) and condensate from the steam collects in a drain gutter 8 from which it may be conducted by one or more pipes 9.

The bottom of the pan is provided with an inlet pipe 10 through which the syrup to be concentrated is admitted and it is also formed with an outlet 11 through which the concentrated mass is discharged from the pan. The upper portion of the pan tapers inwardly to provide a dome 12 above which is located, in a portion of the pan indicated at 13, a vapor separator or saveall (not shown). Leading from the vapor separator is a vapor outlet 14.

In the normal operation of the vacuum pan, the initial charge of syrup admitted to the pan is of sufficient volume to cover the upper tube sheet 5, the level usually attained by the initial charge being indicated by the dot and dash line 15. With steam in the calandria 2 and a vacuum existing in the interior of the pan by virtue of condensing the vapors removed through the outlet 14 by a suitable condenser (not shown), the normal circulation of the boiling mass in the pan is upwards in the tubes 4 and downwards in the downtake 3. As concentration of the syrup proceeds, additional syrup is drawn into the vacuum pan at the proper times through inlet pipe 10, of which there may be a plurality, to promote the formation of crystals in the usual way until the contents of the pan reach the strike level, indicated by the dot and dash line 16.

In the standard construction of vacuum pans, where no attempt is made to separate the ascending and descending currents in the circulating mass above the calandria, the ascending mass containing vapor bubbles converges towards the center of the pan and instead of rising to the surface of the mass where the entrained bubbles would be liberated, much of it takes the shortest path of return to the under side of the calandria and consequently interferes with and retards the descent of circulating currents returning from the surface. To prevent this undesirable result, a tubular device is provided above the downtake of the calandria which defines a passageway for the descending circulating mass and which is so formed as to cause substantially all of the ascending circulating currents to rise to the surface of the mass where the entrained vapor bubbles will be liberated. By compelling the ascending mass to rise to the surface before returning to the calandria, a greater temperature differential than is otherwise possible will exist between the ascending and descending currents and the circulation of the mass will, therefore, be accelerated. More rapid circulation also results from the circumstance that the difference in density between the ascending and descending currents is increased by reason of the descending currents being substantially free of vapor bubbles.

In the form of the invention illustrated the tubular device 17 for separating the ascending and descending currents comprises a plurality of vertically spaced annular members 18 which are positioned above the downtake 3 of the calandria in substantially coaxial relation therewith to provide a vertically extending passageway for the circulating mass descending toward the downtake. Each of the annular members is provided with an upwardly flaring outer surface 19 for deflecting the circulating mass ascending from the tubes 4 away from the column of circulating mass descending within the annular members. Annular members having the desired outer surface may be easily formed from sheet metal in the shape of inverted frusto-conical sections.

The annular members may be rigidly connected together and mounted within the vacuum pan by any suitable means, such, for example, as a plurality of angle members 20 which may be secured as by welding to the walls of the downtake. The lower edges of the annular members may be welded to adjacent portions of the angles 20 and their upper portions may be connected to the angles by brackets 21.

The lowermost one of the annular members 18 is spaced sufficiently above the top tube sheet of the calandria to permit the circulation of the initial charge drawn into the pan which usually attains the level indicated by the line 15 and all of the annular members are spaced apart to provide openings or passages enabling the mass within the pan to enter the passageway formed by the annular members at levels intermediate the lower boiling level 15 and the top of the tubular device. Moreover, the uppermost annular member is disposed below the upper boiling level 16. The general direction of the circulation when the pan is full is indicated by the arrows in Figure 1.

The body portion of the vacuum pan tapers upwardly and outwardly as indicated at 22, so that the portion of the pan above the calandria is of greater diameter than the latter. By having an enlarged or increased area above the calandria for the circulating mass, the hydrostatic head of liquid above the upper tube sheet is less for the same volume of liquid and area of heating surface than in the standard type of pan (not shown) where the portion of the pan above the calandria is of the same diameter as the calandria itself. With a smaller hydrostatic head the resistance to circulation of the mass is reduced and the boiling temperature which would normally exist at the heating surface in a quiescent mass is also reduced. The increased area between the annular members 18 and the sides of the pan allows more space for the expansion of vapor bubbles so that the back pressure in the region of the tubes is less and greater freedom of circulation is thereby afforded. Since the velocity of circulation will be faster, the temperature of the circulating mass lower and the freedom or release of vapors from the mass greater, the rate of heat transmission to the mass is increased and the boiling time correspondingly reduced. It will be appreciated that many of the advantages resulting from the increased or enlarged circulating area are to a large measure made possible by providing the pan with a tubular device, such as that formed by the annular members 18, which functions to deflect the ascending circulating mass toward the enlarged area. With the increased circulation and the completeness of mixture of all masses in the pan resulting from the increased circulating area and the annular members 18, greater uniformity of grain formation is made possible.

Figure 3:
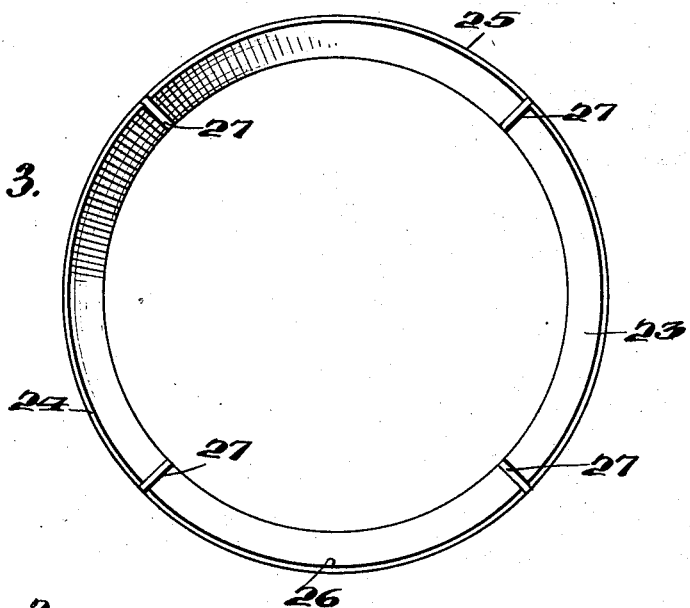
Figure 3 is a plan view of the tubular device shown in Figure 2.
Figure 2:
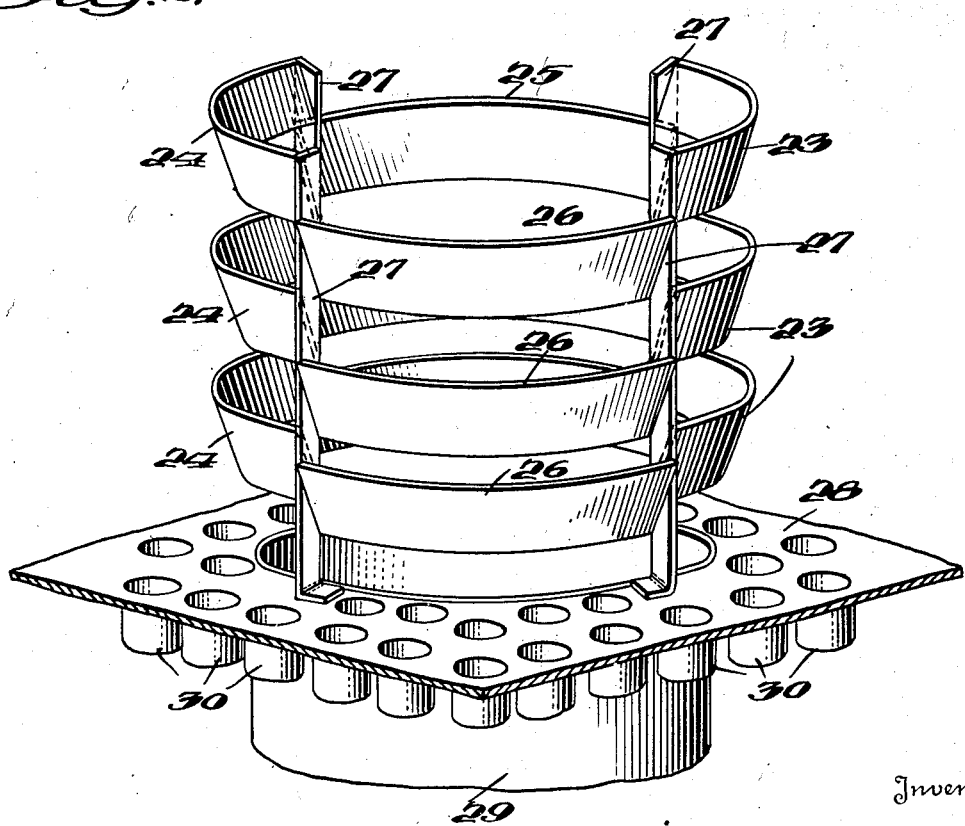
Figure 2 is a perspective view illustrating a portion of the calandria of the pan and a modified form of the tubular device which is positioned above the downtake of the calandria.

In Figures 2 and 3 there is shown a form of tubular device for promoting the separation of the ascending and descending currents of the circulating mass in the pan which has a plurality of sets of vertically spaced curved vanes, respectively designated by the reference numerals 23, 24, 25 and 26. The adjacent ends of adjoining sets of vanes may advantageously abut and be secured to, as by welding, upwardly extending members 27 which are rigidly secured adjacent their lower ends to the upper tube sheet 28 of the calandria having a downtake 29 surrounded by a plurality of vertical tubes 30.

The outer surfaces of the vanes at each set incline upwardly and outwardly so as to deflect the circulating mass ascending from the tubes 30 away from the column of circulating mass descending within the passageway defined by the vanes. The vanes of one set are arranged in staggered relation with respect to the vanes in one or more of the other sets so that the tubular device is provided with a greater number of peripheral openings than the tubular device shown in Figure 1. While the vanes 23 and 24 are shown in the drawings as being disposed in staggered relation with respect to vanes 25 and 26, it will, of course, be appreciated that the vanes may be disposed in other staggered relationships and that a greater or fewer number of sets of vanes may be employed.

In Figures 4 and 5, the tubular device is formed of two helical members 31 and 32, the convolutions of which are respectively vertically spaced from each other to enable the circulating mass within the vacuum pan to overflow at any level into the passageway which the helical members define. The outer surface of each of the helical members is inclined upwardly and outwardly so as to deflect the circulating mass ascending from the tubes 33 away from the column of circulating mass descending within the passageway defined by the helical members.

A plurality of upright members 34 which are rigidly secured adjacent their lower ends to the calandria may be conveniently employed to rigidly position the helical members in substantially vertical alinement with the downtake 35 of the calandria. Each convolution of the helical members may be secured to one or more of the upright members 34 by welding as well as by brackets 36.

From the foregoing, it will be perceived that simple and effective means have been devised for compelling the ascending circulating mass to rise to the surface of the mass so as to prevent interference between the rising stream containing the vapors and the descending mass which has been freed of its steam at the upper boiling level. By thus guiding the circulation of the mass, the descending stream will be cooler than it would be otherwise and its velocity of descent will be materially greater.

While several modifications of the invention have been illustrated and described, other forms thereof falling within the spirit and scope of the invention as defined in the appended claims will be apparent to those skilled in the art.

What I claim is:

1. In a vacuum pan provided with a calandria having a downtake surrounded by a plurality of tubes and with a tubular device positioned above the downtake of the calandria for promoting the circulation of the mass being concentrated in the pan, the improvement wherein the body of the pan above the calandria is of greater diameter than the portion of the pan surrounding the calandria to provide an enlarged area for the circulation of the mass, and wherein the tubular device is peripherally apertured and is provided with vertically spaced peripheral portions having upwardly flaring outer surfaces for deflecting the circulating mass ascending adjacent the tubular device outwardly toward said increased area.

2. In a vacuum pan provided with a calandria having a down take surrounded by a plurality of tubes and with a tubular device positioned above the downtake of the calandria for promoting the circulation of the mass being concentrated in the pan, the improvement wherein the body of the pan above the calandria is of greater diameter than the portion of the pan surrounding the calandria to provide an enlarged area for the circulation of the mass, and wherein the tubular device consists of a plurality of vertically spaced annular members respectively having upwardly and outwardly inclined outer surfaces to deflect the circulating mass ascending adjacent thereto outwardly toward said increased area.

JAMES HAMILL.